United States Patent [19]

Sexton et al.

[11] Patent Number: 5,752,236
[45] Date of Patent: May 12, 1998

[54] LIFE INSURANCE METHOD, AND SYSTEM

[76] Inventors: Frank M. Sexton, 30 Serendipity Way;
Swinton B. Burkhalter, 10 Wildwood Valley, both of Atlanta, Ga. 30350

[21] Appl. No.: 301,232

[22] Filed: Sep. 2, 1994

[51] Int. Cl.$^6$ ................................................ G06F 157/00
[52] U.S. Cl. ........................................ 705/4; 364/710.04
[58] Field of Search ............................. 364/401 R, 406, 364/225, 408, 709.05, 710.04; 395/147, 153, 156, 204, 201; 283/54; 705/1, 4

[56] References Cited

U.S. PATENT DOCUMENTS

| | | | |
|---|---|---|---|
| 4,831,526 | 5/1989 | Luchs et al. | 364/401 |
| 5,191,522 | 3/1993 | Bosco et al. | 364/401 |
| 5,291,398 | 3/1994 | Hagan | 364/408 |
| 5,429,506 | 7/1995 | Brophy et al. | 434/107 |

FOREIGN PATENT DOCUMENTS 07056992  3/1995  Japan.

OTHER PUBLICATIONS

LaRock, Seymour, "COLI: an excutive comp. supplement", Employee Benefit Plan Review, Feb. 1992, p. 33, Dialog File 169, Acc. No. 00122762.

Cuddy Michael, sec. 848 capitalization of Insurance acquisition costs; Tax Adviser, 23, n4, 234(5). Apr. 1992, (Dialog File 148, Acc. No. 0592 0659).

Aase, Knut, "Premiums in a dynamic model of a reinsurance market", Scandinavian Actuarial Journal, 1993, No. 2, pp. 134–160. (Dialog File 239, Acc. No. 16088409).

*Primary Examiner*—Gail O. Hayes
*Assistant Examiner*—Frantzy Poinvil
*Attorney, Agent, or Firm*—Joseph Golant

[57] ABSTRACT

Life insurance methods, systems and products which revolve around having an insurance plan with at least two separate but related insurance contracts on the same insured or insureds. The contracts are developed using life insurance product data to develop tables from which death benefits and premium obligations, and usually cash values, are determined based upon an insured's gender, age and other risk factors. The death benefits and premium obligations, and cash values, if any, are divided between the two or more contracts where more of the premium obligations are assigned to one or more of the contracts while more of the death benefits and cash values, if any, are assigned to one or more of the remaining contracts. Nonforfeiture and surrender provisions as well as typical riders can be added to one or all of the contracts. The death benefits and cash values of the contracts are a function of the premiums paid for all of the contracts.

31 Claims, 8 Drawing Sheets

LIFE INSURANCE METHOD, AND SYSTEM

BACKGROUND OF THE INVENTION

1. Field of the Invention

This invention relates generally to a life insurance plan, and more specifically to life insurance methods, systems and products using two or more separate but related insurance contracts.

2. Historical Description of Life Insurance

Many types of insurance policies are on the market today. Some insure against death or disability for a limited number of years only, while others cover an entire life; some call for the payment of premiums for a stated number of years only, others for the entire duration of the contract; for some, premiums are fixed, whereas with others the policy owner determines the level of premiums to be paid, within certain guidelines. Some insurance promises a payment of policy benefits in one lump sum, whereas others provide for payment in a fixed number of installments.

Historically, life insurance benefit patterns have fit into one or a combination of three classes: "term life insurance", "endowment insurance" and "whole life insurance". Term life insurance pays a predetermined sum to a beneficiary if the insured's death occurs during a set number of years (the term of the insurance contract) that is less than an entire lifetime. Endowment insurance, like term insurance, pays a predetermined sum to a beneficiary if the insured's death occurs during the contract term and additionally, typically, pays the same predetermined sum to the policy holder if the insured survives the contract term. Whole life insurance pays a predetermined sum to a beneficiary when the insured dies, regardless of when death occurs. Term contracts or policies typically have no cash values whereas the opposite is true of endowment and whole life policies.

There are many different variations of term life insurance policies and even more of whole life insurance policies. For example, there is "ordinary life" which provides whole life insurance with premiums that are payable during an entire lifetime. Other names for ordinary life include "straight life" and "continuous-premium whole life". There is also "limited-payment whole life" policies where the face amount of the policy is payable at death, but premiums are charged for a limited number of years, after which the policy becomes paid-up for its full face amount.

There is also "indeterminate-premium whole life insurance". The key to this contract is a premium that is lower than the maximum permissible contractual obligation. In effect, a significant discount from the maximum premium is guaranteed for the first few contract years. Annually thereafter, the premium actually payable is set by the company, subject to a maximum constraint. The policy is designed to reflect, through its premium structure, up-to-date expectations as to future operating experience.

Another kind of insurance is "current assumption whole life" where policies provide life insurance under a non-traditional, transparent format that relies on an indeterminate-premium structure. These policies typically use new-money interest rates and current mortality tables in their cash-value determination. This fact has led to the products being referred to as "interest-sensitive whole life".

Yet another kind of policy is "variable life insurance" which is whole life insurance whose values will vary directly with the performance of a set of earmarked investments. Other policies include "modified life", "enhanced ordinary life", "graded premium whole life", "single-premium whole life" and "indexed whole life". Details concerning all of these policies and other insurance concepts and information may be acquired by reference to: Black & Skipper, *Life Insurance,* (Prentice Hall, 12th Edition 1994). Helpful definitions may be found in: Ingrisano & Ingrisano, *The Insurance Dictionary,* (Dearborn Financial Publishing, 3rd Edition 1990). Relevant portions of both books are incorporated herein by reference.

The most common characteristic of all types of life insurance policies issued today is that all of the values and benefits entitled to the policy owner are contained in a single contract. The policy benefits of cash values and death proceeds are a function of the premiums paid into that policy and the investment and expense experience of the company issuing the policy.

Individually issued life insurance policies often are used to provide supplementary benefits to selected employees. The employees typically are those whose skills, talents and experience make them valuable assets to the business. Through insurance, the employer can provide benefits beyond those offered to other employees. The object, of course, is to attract and retain talented employees by rewarding them in special ways. These plans are typically "non-qualified", meaning that the employer makes no effort to meet the qualification requirements of the Internal Revenue Code for tax favored treatment of the plan's costs or benefits. A qualified plan must meet certain non-discrimination requirements as well as a host of other requirements.

In the 1950's the significance of separating the various values and benefits of a single life policy into component parts was recognized. This allowed two different entities, such as an employer and an employee to share the premiums and benefits of a single policy. Such shared policies became known in the insurance industry as "split-dollar" insurance. While the insurance contract was between the policy owner and the issuing company, the premium and benefits allocation was contractually established in a separate written agreement between the two different entities (i.e. the employer and the employee).

Split-dollar life insurance is an arrangement for providing funding for individually issued, cash value life insurance. It is a funding method, not a type of policy. The written agreement divides or splits the death benefit, the living benefits (cash values) and the premium obligation between two parties—hence the name "split-dollar insurance." The objective of split dollar plans is to join together the insurance needs of one person with the premium paying ability of another. Often, this means cooperation between an employee and his or her employer, but the concept can also be applied to an infinite variety of other relationships: child-parent, stock holder-corporation, buyer-seller, charity-donor, trust-grantor, charity-trust, and so on.

The split-dollar plans may provide employees with substantial amounts of life insurance protection, generally at a current outlay well below that which they would pay for the same policies purchased individually. When used as a fringe benefit, split-dollar insurance proceeds are usually intended, (1) as a death benefit to the employee's beneficiary and (2) as a reimbursement to the employer for its share of premiums paid.

Under a split-dollar arrangement, the employer and employee join in the purchase of a cash value containing life insurance contract on the employee's life. Typically, the employer provides the funds to pay that part of each annual premium that is equal to the annual increase in the cash value. The employee pays the balance. The employer is entitled to receive death proceeds from the policy equal to the cash value, or at least a sufficient part so as to equal its total premium payments. The employee names the beneficiary for the balance of any proceeds. Although the employee's share of annual premiums may be substantial in the early years it will decrease each year as the annual increases in cash value grow progressively larger. In many cases the employee's premium share reaches zero after a relatively short time.

As the employer takes over more of the obligation to pay premiums, its share of the death proceeds increases. Nevertheless, through the appropriate use of dividends or other options, the employee's share of the death benefit often can be maintained at an approximately constant amount. If it is desirable for the employee, instead of the employer to have rights to the cash value and for the employer, instead of the employee, to control the disposition of the death proceeds, a "reverse split-dollar" plan is created. The traditional role of employer and employee are reversed.

Though generally popular, several drawbacks to the split-dollar plan exists. First, there are always problems of contract interpretation between the parties to the plan. Second, there are also a number of applicable Internal Revenue Service Revenue Rulings, Private Letter Rulings and Tax Court cases to be reviewed and analyzed to determine tax consequences. Third, the marketing, sale and administration of split-dollar plans are difficult and expensive because they are complicated to install and administer, and they require the services of accountants and lawyers.

Another previous insurance product was referred to as a "Section 79 Plan". This was a group term life insurance plan under Section 79 of the Internal Revenue Code (and thus qualified) whereby the employer paid the premiums. The employee, however, must report as gross income, the cost of insurance for the amount of death benefit over $50,000. When properly arranged, the cost of the premiums is also fully deductible by the employer. The Section 79 Plan was designed as a way to provide permanent life insurance under group life insurance tax regulations. While the insurance plans discussed until now call for one contract containing all values and benefits, a few companies under Section 79 Plans designed a two policy plan in which one of the policies was a decreasing term contract and the other was an increasing death benefit permanent contract. Each contract, however, had its own independent premiums and policy values and they were not related. The policies did, however, insure the same insured.

Even though two policies were used, the method of determining premiums, expenses and benefits for each policy was traditional. The premium and policy values were fixed by the issuing company and could not be divided differently for differing situations. The two contracts were very similar to existing products in the marketplace in that the term plan looked and performed like many other decreasing term life insurance contracts and the permanent increasing death benefit contract performed similar to an annuity or an endowment contract. Subsequent tax laws and regulations have severally restricted Section 79 Plans so that today no companies are known to actively market products of this type. Also, Section 79 Plans were not suited for split-dollar arrangements, and were not used for such applications.

Life insurance has many other uses besides the one of providing supplementary benefits to selected employees. For example, life insurance is used in key man situations, estate preservation situations, buy-sell arrangements, charitable giving programs, income replacement applications, retirement plans and estate liquidity situations. Like split-dollar applications, single policy life insurance contracts for all of these other applications also have limitations. Thus, simple, easy-to-understand, flexible, economically advantageous, and easily installed and administered life insurance plans for all of these applications and as well as others have not been developed even though such plans would have obvious usefulness and market potential.

BRIEF SUMMARY OF THE INVENTION

Many of the inadequacies in previous life insurance programs have been resolved by the present invention which are life insurance methods, products and systems that are simple, direct, flexible, easy to use and easy to understand.

As a method for forming a life insurance plan, the invention comprises the steps of procuring life insurance product data, selecting death benefit and premium obligation, and if applicable, cash value, amounts based upon gender, age and other risk factors from said data; storing factors representing regulatory requirements in a data processing apparatus; forming in the apparatus at least two separate but related insurance contracts; dividing the death benefit, premium obligation and cash value, if any, amounts between the contracts; comparing each of the contracts with the regulatory requirements; and displaying the resulting two contracts.

The invention may be expressed as a different method for forming a life insurance plan which comprises the steps of procuring life insurance product data; selecting death benefit and premium obligation and, usually, cash value amounts based upon gender, age and other risk factors from the data; forming at least two separate but related insurance contracts; dividing the death benefit, premium obligation and cash value, if any, amounts between the contracts; comparing each of the contracts with regulatory requirements; and publishing the resulting contracts.

The method may be stated in another way with the following steps: developing price information; developing life insurance products; providing a data processing apparatus; inputting into the apparatus risk factors relating to a prospective insured; deriving from the apparatus premium obligation, death benefit and, usually, cash value amounts; instructing the apparatus to allocate the premium obligation, the death benefit and the cash value, if any, amounts between at least two related insurance contracts; inputting into the apparatus regulatory requirements to be met by a life insurance contract; comparing in the apparatus each of the contracts with the regulatory requirements; and displaying the resulting premium obligation, death benefit and cash value amounts allocated to each of the contracts.

Yet another method comprises the steps of obtaining life insurance information including death benefits, premium obligations and, usually, cash values also; dividing these between at least two separate but related contracts; and comparing at least one of the contracts with preselected requirements.

The invention can also be stated as a life insurance system comprising a computer, means connected to the computer for inputting instructions; the computer having life insurance base product tables and regulatory requirements stored therein; inputted instruction in the computer to divide death benefits, cash values, if desired, and premium obligations between at least two separate but related life insurance contracts; inputted instructions in said computer to compare the contracts against the regulatory requirements; and means connected to the computer for displaying the resulting contracts.

Another system comprises phrase life insurance base product data stored in said storing and processing means; premium obligation, death benefit and, if desired, cash value amounts derived from the base product data stored in said storing and processing means; and portions of the premium obligation, death benefit and cash value, if any, amounts are disposed in at least two insurance contracts wherein the total death benefit and cash value amounts for all of the contracts are tied to the total premium obligation amount for all of the contracts.

The invention also takes the form of a life insurance product comprising at least two separate but related insurance contracts formed by splitting death benefit, cash value, if desired, and premium obligation amounts between the contracts wherein the death benefit and cash value, if any, amounts are a function of the premium obligation amounts paid for all of the contracts.

Yet another product comprises means for storing and processing data; at least two life insurance contracts stored in said storing and processing means; death benefit, cash value, if desired, and premium obligation amounts are divided between the contracts in unequal amounts by said storing and processing means; and said storing and processing means having a function connecting the contracts wherein the death benefits and cash value, if any, amounts have a mathematical correspondence to the premium obligation amount paid for all of the contracts.

Accordingly, it is an object of the present invention to provide a life insurance plan having at least two separate but related life insurance policies, each having its own premium, death benefit, cash value, nonforfeiture provisions, riders and other policy provisions wherein the premium is heavily allocated to one or more policies and the death benefits and cash values are heavily allocated to one or more of the remaining policies. Another object of the present invention is to provide an insurance program having at least two separate but related policies with specially allocated benefits and burdens where each has its own policy identification number, policy owner and named beneficiary. Yet another object is to provide an insurance method having at least two separate but related policies with specially allocated benefits and burdens which individually meet the legal requirements of a "life insurance contract" as defined by appropriate law, currently Internal Revenue Code Section 7702. A still further object of the present invention is to provide a life insurance plan having at least two separate but related policies with a unique method of allocating premium obligations, mortality charges, expense factors, cash values, investment yields, and death benefits between the policies.

Another aspect of the present invention is to provide an insurance program of at least two separate but related policies in which the cost factors of mortality, underwriting, commission and other usual expense factors will be heavily allocated to one or more of the policies while the cash and investment values generated are allocated to one or more of the remaining policies. The premium payments are allocated such that the policy with the highest cost factors will require a disproportionally higher premium payment then for the policy or policies with the investment and cash values. A further aspect of the present invention is to provide an insurance plan having at least two separate but related policies in which each of the policies will have its own non-forfeiture and insurance provisions such that the surrender or lapse of one policy will not cause the surrender or lapse of the other policy or policies.

Still another aim of the present invention is to provide an insurance program having at least two separate but related policies in which the investment values of one of the policies will be affected by the total premiums paid on all of the policies. A decrease or discontinuance of premium payments allocated to pay the cost factors of one of the policies will have an adverse affect on the investment results generated by the other policies but not on their status. Another aim of the present invention is to provide an insurance plan in lieu of a split-dollar arrangement which is simple and easy to understand. Yet a further aspect of the present invention is to provide an insurance program of at least two separate but related policies which is simple yet flexible and one which has a wide scope of applications. Another advantage of the present invention is to provide an insurance plan having at least two separate but related life insurance contracts that allow maximum tax benefits to its owners.

A more complete understanding of the present invention and other objects, aspects, aims and advantages thereof will be gained from a consideration of the following description of the preferred embodiments read in conjunction with the accompanying drawings provided herein.

DETAILED DESCRIPTION

Figure 1:
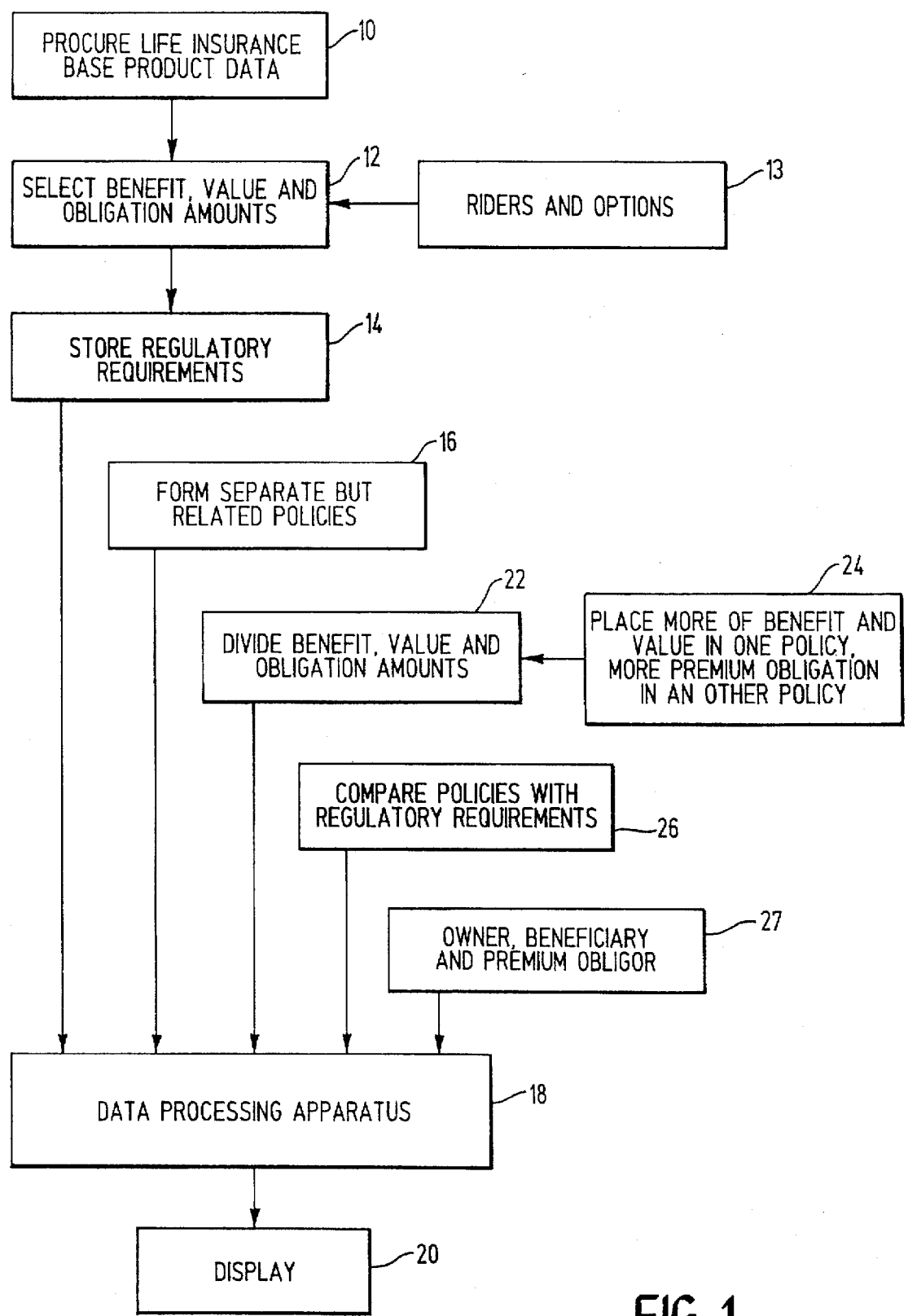
FIG. 1 is a block diagram showing a method for forming a life insurance plan in accordance with the invention herein.

While the present invention is open to various modifications and alternative constructions, the preferred embodiments shown in the drawings will be described herein in detail. It is to be understood, however, that there is no intention to limit the invention to the particular forms disclosed. On the contrary, the intention is to cover all modifications, equivalences and alternative constructions falling within the spirit and scope of the invention as expressed in the appended claims.

The classical split-dollar plan, as mentioned above, has two parties, an employer and its employee, for example, join in the purchase of a cash value life insurance contract on the employee's life. The employer provides the funds to pay that part of each annual premium that is equal to the annual increase in cash value. The employee pays the balance. The employer is entitled to receive death proceeds from the policy equal to the cash value or at least equal its total premium payments, while the employee names the beneficiary for the balance.

Under a reverse split-dollar plan the traditional roles are reversed. In the employer-employee situation, the pure death protection is made payable to the employer corporation, and the death proceeds equal to the cash value are payable to the employee's beneficiary. The employee owns the policy and the cash value, and he endorses to the employer the right to name the beneficiary for a portion of the death proceeds.

As a general rule split-dollar and reverse split-dollar plans are typically unqualified, meaning that the employer makes no effort to meet the qualification requirements of the Internal Revenue Code for tax favored treatment of the plan, cost or benefits. A qualified plan must meet certain non-discrimination requirements as well as a host of other requirements. The very purpose of a special employee compensation plan however is to discriminate in favor of a select few employees. Hence, such plans usually are non-qualified and premium payments are not deductible by the corporate employer for income tax purposes.

It is an object of the present invention to provide an insurance plan to achieve the advantages of split-dollar or reverse split-dollar plans as well as other applications but without the drawbacks of those single policy plans.

This is done according to the present invention by having the elements, characteristics, obligations, values and benefits of a life insurance product, existing or new, arranged into at least two separate but related contracts on the same insured or insureds. The combined total values and benefits of the companion contracts will approximate the total values and benefits contained in a single contract with similar total premiums. Each of the contracts will, of course, qualify as a life insurance contract under applicable law, such as that currently embodied in Internal Revenue Code Section 7702. The two or more contract approach will also allow various optional riders to be added to any or all contracts such that the combination of the contracts with riders will exhibit about the same values and benefits per premium paid as a single insurance contract with similar riders and similar premium payments.

In more detail, Section 7702 of the Internal Code states a test that must be met by life insurance contracts. The test has two alternatives and whichever alternative is chosen, that test must be met for the entire life of the contract. The first test applies mainly to traditional cash value policies. This cash value accumulation test requires that, by the terms of the contract, the cash surrender value cannot at any time exceed the net single premium required to fund future contract benefits. The net single premium is calculated by assuming an interest rate equal to the greater of 4% or the rate guaranteed in the contract. The mortality charges are based on those specified in the contract, or, if not specified, the mortality charges used in determining statutory reserves for that contract. For contracts issued after Oct. 20, 1988, the mortality charges must be reasonable and cannot exceed those of the prevailing mortality table required by the state insurance regulators—currently, the *Commissioner's 1980 Standard Ordinary Mortality Table*.

The second test intended for universal life and related policies requires that both a guideline premium and a death benefit test be met. The guideline premium requirement is met if accumulative premiums paid under the contract do not exceed, at any time, the greater of the "guideline single premium" or the sum of the "guideline level premiums" at that time. The guideline single premium is computed using interest at the greater rate of 6% or the rate guaranteed in the contract. Mortality charges are based on the same standard as applies to the cash-value accumulation test. Guideline level premiums are computed in a manner similar to the computing of the guideline single premium, except that the minimum interest rate is 4% rather than 6%. The death benefit requirement is met if death benefits exceed 250% of the cash value for an insured of attained age up to age 40, grading down to 100% of the cash value at attained age 55. Thus, if a 35 year old owns a cash-value policy whose cash value is $10,000 the policy death benefit must be at least $25,000 for the policy to meet the death benefit requirement.

A major advantage of the new plan is that it eliminates interpretation disputes between the parties to the policy rights agreement; there is no policy rights agreement between the parties to be disputed. Instead, there are, in most cases, two contracts: one is between one party and an insurance company, and the other is between the other party and the same insurance company. The different values and benefits to each party will be spelled out in their respective life insurance contracts which each party receives. Another advantage is that the marketing and sale of the new product will be greatly simplified because the complex body of law dealing with applications, such as split-dollar plans, is simply not relevant. The selling agent and the prospective policy owners will not need the advice of accountants or attorneys to examine the tax and legal aspects as would be the case with a split-dollar plan. The new plan will be very easy to understand, and it will be flexible and expansive in scope.

Another advantage is that there will no longer be a need to rely on Revenue Rulings and Tax Court cases to determine an acceptable policy plan split from the standpoint of the Internal Revenue Service. There will be no question concerning the issue of "economic benefit" as defined in the Tax Code and no need to rely upon P.S. 58 Tables or insurance company Non-Renewable Term (NRT) rates to measure the "economic benefits" received by each party. The cost and benefits will be clear as the values will be specified in each of the two contracts.

Still another advantage of the new insurance system is a prospective insured's ability to understand the advantages of splitting life insurance benefits, obligations and values between two entities. Current split-dollar arrangements, for example, are very difficult, if not impossible for most prospective insureds and/or owners to understand. The new plan will also allow the prospective insureds and/or owners to better utilize the differing income tax brackets and estate tax brackets of different tax entities to maximize investment returns and/or minimize costs. It will also provide greater flexibility for prospective insureds and/or owners in that each of the two contracts can be maintained on its own without regard to the status of the other. The ownership and beneficiary designations of one contract can also be changed without altering the status of the other. This kind of flexibility is not available under the single contract plan once that contract is established. For simplicity, the description here will focus on a two contract plan rather than three or more contracts. It is to be understood, however, that more than two contracts on the same life or lives could be used if desired.

To understand the simplicity of the new life insurance plan reference is made to FIG. 1 which illustrates in block diagrammatic form one of the inventive methods disclosed herein. The method includes the procuring of Select Life Insurance Base Product Data which is represented by block 10. The Data is defined here as tables produced by life insurance companies for each type of life policy contract offered by that company. The Data is usually derived from the pricing by these companies of their life insurance products. In turn, the calculation of life insurance rates and values requires information and assumptions regarding five elements: 1.) the probability of the event insured against occurring; 2.) the time value of money; 3.) the benefits promised; 4.) expenses; and 5.) profits and contingencies.

The probability of the event, death, is usually determined from mortality tables which show yearly probabilities of death. These tables show incidences of death for a given group of insureds over time—often from birth to the death of the final person in the group. These tables also constitute the foundation upon which the expected costs of life insurance are based. The time value of money relates to the fact that life insurance companies collect premiums in advance of providing insurance coverage. In longer-term coverage, that portion collected but not needed immediately to cover losses and expenses is invested and produces earnings that are used to supplement premium income to fund future expected benefits and ongoing expenses. In such cases, insurers discount premiums in advance in recognition of the fact that they will earn interest on the accumulated funds. The benefits promised may vary from policy to policy. The premium computation must take into account the period of coverage, the level of coverage, as well as all other factors related to the benefits promised the insured under the contract. Included here is the likelihood of policy owners voluntarily terminating their policies.

Life insurance rates that are calculated to recognize the probability of death occurring, the time value of money and the benefits promised are referred to as "net rates." They do not make allowance for the expenses the insurer incurs in selling, issuing and maintaining the policy, nor do they make provisions for profits or unforeseen contingencies. When "loadings" for expenses, contingencies and profits are added to the "net rate", the "gross rate" is obtained. The gross rate is the amount actually charged policy holders.

In computing net and gross rates, each insurance company considers its objectives and its past experience for each factor involved. Even though the above data is followed in principle by many life insurers, a more common method of deriving a company's gross premium rate structure is for the insurer to select gross rates for pivotal ages (usually based on market and competitive considerations) and then to test these selected rates against its objectives and expectations as to realistic future experience. If the test rate does not produce the profit and desired results, the rate will be changed and the test repeated. With this procedure, the insurer does not calculate a net rate and add amounts to cover expenses, profits and contingencies; instead the insurer simply selects a target gross rate to be tested against the company's anticipated future operating experience.

Still another approach to establishing a gross premium rate structure is to calculate gross premium rates directly through the use of realistic assumptions of: 1.) interest; 2.) mortality; 3.) expenses; 4.) number of lapse policies; and 5.) profit and contingencies. With cash values and a dividend scale assumed, the gross premium rate is determined by a mathematical equation. Regardless of how the tentative gross rate is derived, it is tested against the company's anticipated future operating experience.

The gross premium rate structure of a new policy is tested by the issuing company not only to determine if the rate structure will develop sufficiently high asset accumulation to provide the surrender values and death and other benefits promised under the contract, but is tested to make sure the rate structure meets regulatory requirements.

The gross premium rate calculations produce the tables mentioned above showing values, such as cash values, dividend values and death benefit values, for each gender, age and risk classification (for example, preferred, non smoker, smoker, etc.) for each type of insurance contract offered for sale by each life insurance company.

From this information, many different types of life insurance products are derived. These include traditional whole life policies, interest sensitive whole life policies, flexible premium whole life policies, universal life policies with level death benefit, universal life policies with increasing death benefit, flexible premium universal life policies, variable life policies with level death benefit, variable life policies with increasing death benefit, participating or non-participating whole life, level premium policies or graded premium policies, second to die policies of all types, first to die policies of all types, term policies of all types, and the like.

It is to be understood that the data developed is not guaranteed, but is a projection of future values based on certain assumptions concerning the pricing elements. The results actually produced for the policy owner will vary from the projection based upon actual experience.

Reference to the tables by gender, age and risk factors provide the various costs for death benefit and cash value amounts and show the premium obligations involved. Hence, the method here includes selecting these amounts and is represented by block 12 in FIG. 1. Additional factors such as riders, second insured input data, dividend options and other options may also be considered as shown by block 13. The Base Product Data may be used to create a new single policy insurance product or products, or the Data from an existing single policy insurance product or products may be used for the method here. Alternatively, the Data may be used to design two new insurance contracts, or two existing products could also be used as will be understood shortly.

As illustrated by block 14, state and federal regulatory requirements are collected and stored most efficiently in a data processing apparatus 18, such as a computer, having a display 20, such as a monitor and a printer. Block 16 represents the formation of two or more separate but related policies. By use of the terms "policies" and "contracts" it is meant life insurance contracts, life insurance policies, proposed contracts or policies, terms for such contracts or policies, outlines of contracts or policies, or any other shorthand variation of a contract, policy or prospective contract or policy that one might want to use. The selected death benefit, cash value and premium obligation amounts, at least, are divided between the policy contracts, shown by block 22. This is the division by the prospective owners of the contract policies of premium obligations, death benefits, cash values, guaranteed and non-guaranteed, riders and other aspects between at least two separate but related insurance contracts on the same life or lives in a way most beneficial to each to them.

Allocation is relatively simple. If X percent of the premium obligation is allocated to the first of two contracts then (100-X) percent is allocated to the second contract. If Y percent of the death benefit is allocated to the first contract then (100-Y) percent is allocated to the second contract. If Z percent of cash values is allocated to the first contract then (100-Z) percent is allocated to the second contract. An analogous split can be made if more than two contracts are used in a plan. Of course, the actual percentages are determined by a number of factors, such as legal requirements, tax brackets, policy types and the like.

Using the two policy concept, the intention here is to allocate more of the cost factors of an insurance product to one of the two contracts while more or all of the cash values and investment values are allocated to the other of the two contracts. The premium obligations will be allocated such that the contract with the highest cost factors has the higher premium payment obligation. This is shown by block 24.

By way of example, Table I shows a typical life insurance contract for a male, age 45, might contain the following amounts:

TABLE I

| YEAR | ANNUAL PREMIUM | CASH VALUE | DEATH BENEFIT |
|---|---|---|---|
| 1 | $10,000 | $0 | $500,000 |
| 2 | $10,000 | 3,000 | $500,000 |
| 3 | $10,000 | 7,000 | $500,000 |
| 4 | $10,000 | 13,000 | $500,000 |
| 5 | $10,000 | 19,000 | $500,000 |
| 6 | $10,000 | 30,000 | $500,000 |
| 7 | $10,000 | 46,000 | $500,000 |
| 8 | $10,000 | 62,000 | $500,000 |
| 9 | $10,000 | 78,000 | $500,000 |
| 10 | $10,000 | 100,000 | $500,000 |

In comparison, Table II shows a plan with two separate but related contracts on the same insured that may contain the following values:

TABLE II

| | FIRST CONTRACT | | | SECOND CONTRACT | | |
|---|---|---|---|---|---|---|
| YEAR | ANNUAL PREMIUM | CASH VALUE | DEATH BENEFIT | ANNUAL PREMIUM | CASH VALUE | DEATH BENEFIT |
| 1 | $7,000 | $0 | $200,000 | $3,000 | $0 | $300,000 |
| 2 | $7,000 | 1,000 | $200,000 | $3,000 | 2,000 | $300,000 |
| 3 | $7,000 | 2,000 | $200,000 | $3,000 | 5,000 | $300,000 |
| 4 | $7,000 | 3,000 | $200,000 | $3,000 | 10,000 | $300,000 |
| 5 | $7,000 | 4,000 | $200,000 | $3,000 | 15,000 | $300,000 |
| 6 | $7,000 | 5,000 | $200,000 | $3,000 | 25,000 | $300,000 |
| 7 | $7,000 | 6,000 | $200,000 | $3,000 | 40,000 | $300,000 |
| 8 | $7,000 | 7,000 | $200,000 | $3,000 | 55,000 | $300,000 |
| 9 | $7,000 | 8,000 | $200,000 | $3,000 | 70,000 | $300,000 |
| 10 | $7,000 | 10,000 | $200,000 | $3,000 | 90,000 | $300,000 |

As can be seen, the combined amounts of the first and second policy contracts in Table II equal the amounts of the single life insurance contract in Table I.

After the allocation of the premium obligations, death benefits, cash values and other items is completed, the resulting policies are tested against applicable regulatory requirements. This comparison is most efficiently done by the computer. If the allocations for the first contract do not comply with the requirements, the allocations are adjusted and the policy is compared again to insure compliance. The same procedure is then used for the second policy contract. The comparing step is illustrated by block 26. Thereafter, the contract policies are finalized and prepared in traditional formats, or in new formats if desired.

The proposed amounts, allocation information and regulatory requirements, blocks 12, 16 and 22 may all be inputted into the computer. All of the Data and information represented by blocks 10, 12, 16, 22, 24 and 26 may be stored, inputted and manipulated in the computer for ease, convenience, speed and economic reasons.

It is important that each of the policies meet the test for life insurance or a modified endowment contract as defined by Internal Revenue Code Section 7702. Every policy must also meet the statutory requirements for reserves and cash surrender values mandated by state laws. All states have adopted the NAIC model standard evaluation law and NAIC model standard non-forefeiture law. The cash values produced, the premiums charged and the death benefits may be allocated to any policy in any proportion consistent with federal and state regulations. The total benefits of all policies is a function of the total premium paid for all policies. A decrease or a lapse of premium payments in one policy will, of course, effect the benefits available in all policies. Also, a future re-allocation of premiums and values may occur as changes in regulations occur.

It must be emphasized that the first and second contracts, for example, are separate in that should the first contract lapse, for failure of premium payments, for example, that event will not affect the status of the other contract as long as the premium obligation on the other contract is paid. However, the two contracts are related in that the cash values and, depending upon which life policies are used, death benefits of both contracts are determined by the total of the premiums paid on both contracts.

As can now be understood, the two-contract-plan approach allows for substantial flexibility on the part of the policy owners. For example, the two contracts may be for different types of life insurance policies. The first policy may be traditional life whereas the second policy may be variable life. Or, the first contract may be a term policy whereas the second contract is a traditional life policy. The uniqueness of the two contract approach is derived from the allocation of costs, benefits and values between the two contracts. This concept can be used on every type of existing cash value and term life insurance contract with any additional existing or future riders or any type of special allocation of policy expenses and cash values. This concept can also be used in a variety of applications, other than split-dollar, where currently a single policy life insurance contract is used. It is to be remembered that a two policy plan will be described here as an example and because it will be the most likely plan to be used; however, plans of more than two policies may be used if found desirable.

The method for forming the plan also requires the establishment of an owner, a beneficiary and a premium obligor for each of the contracts, as represented by block 27. Also, the method includes establishing non-forefeiture and surrender provisions for each of the contracts. Since different owners, beneficiaries, obligors and provisions may be used in each of the contracts, maximum advantages are obtainable.

The important relationship between the policies, as previously explained, is that the cash values of the policies (or of one of them when the other is a term policy) are a function of the total premium obligations actually paid for all of the policies. While a lapse of one of the policies will not cause a lapse of the second, the cash values in the non-lapsed policy will, of course, be affected.

Figure 2:
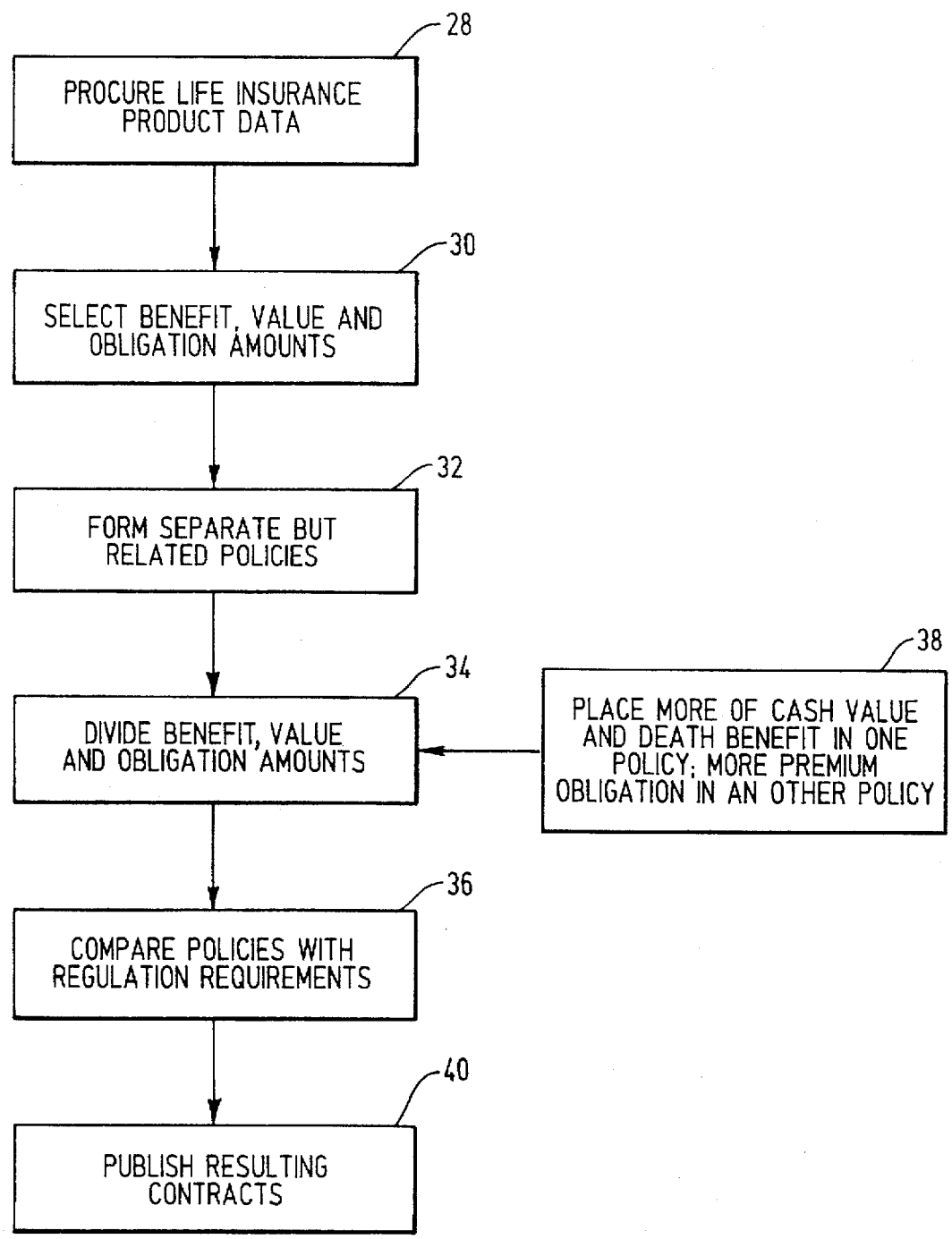
FIG. 2 is a block diagram showing another inventive method for forming a life insurance plan.

A more simplified method is illustrated in FIG. 2. There, the procuring step is represented by block 28, the selecting step by block 30, the forming step by block 32, the dividing step by block 34 and the comparing step by block 36. The detail regarding placement of more cash value and death benefit amounts in one policy and more premium obligation amounts in another policy is represented by block 38. At the end of the method, the contracts may be published, and this publishing step is represented by block 40. It is to be understood that the forming step may consist only of forming terms or an outline of a contract or proposed contract and not the full contract. The same is true of the comparing and publishing steps. This matter is one of marketing. Of course, it is to be expected that when all of the information is acquired and a purchase has been made, full contracts or legally acceptable substitutes will be produced by the selling company.

Figure 3:
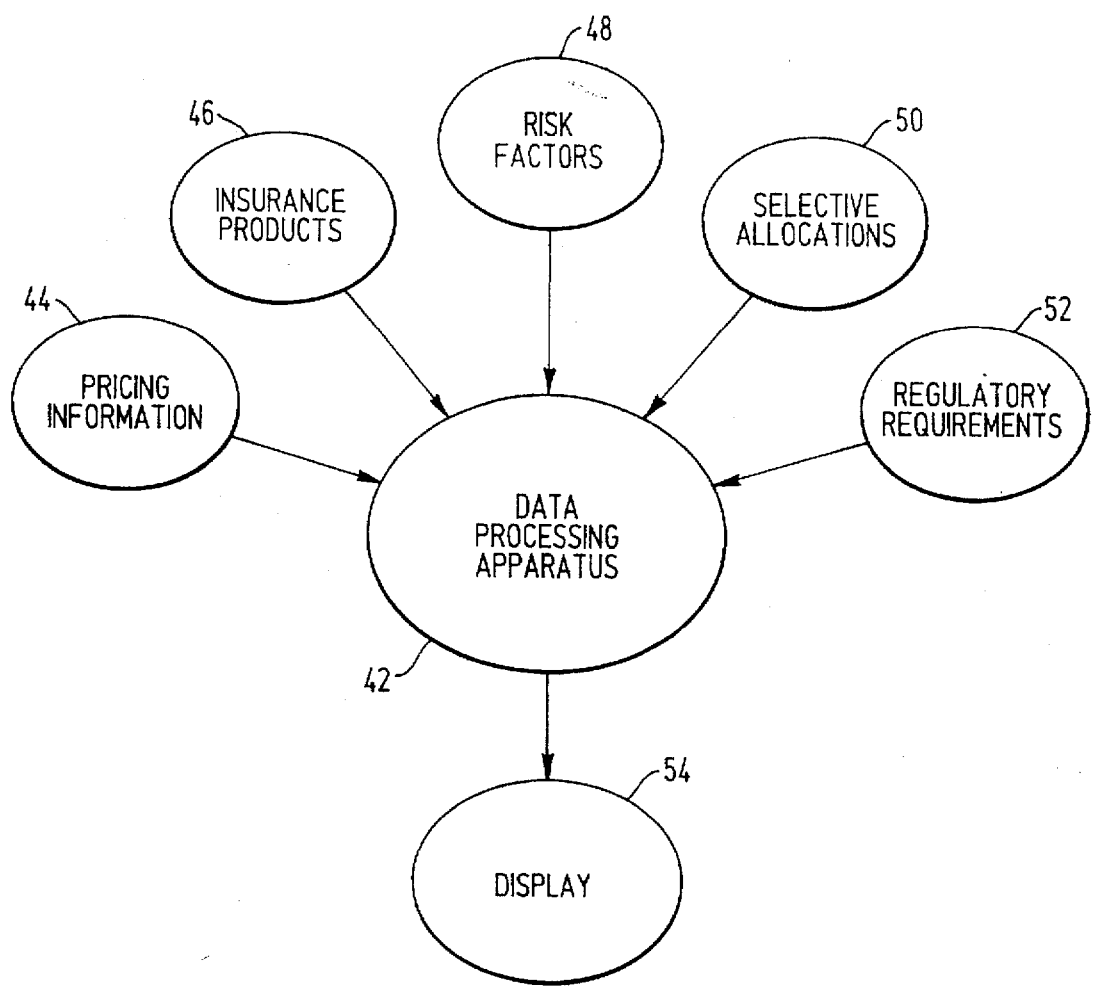
FIG. 3 is a block diagram showing yet another inventive method for forming a life insurance plan.

Another method of the present invention is illustrated by FIG. 3. A data processing apparatus, such as a computer, represented diagrammatically by the circular block 42, is programmed to form at least two insurance policies on the same insured (or insureds) based upon pricing information represented by the circular block 44, product determination represented by the circular block 46, risk factors represented by the circular block 48, allocation determinations of the premium obligation, cash value and death benefit amounts represented by circular block 50 and regulatory requirements represented by the circular block 52. The computer is then programmed to display, block 54, either on a screen or by a printer, or both, possible policies and even a finalized policy if desired. Once again, the contracts are separate in law (each has its own identification number) but are related financially in that the cash value and death benefit amounts of the policies are a function of the premium obligations paid for all of the policies in a manner directly analogous to the relationship of the cash value and death benefit amounts in a single contract to the premium obligation paid for that contract. If "participating" policies are used, where dividends are typically employed to purchase paid-up additions which increase the death benefit as the cash value increases, then it can be seen how the death benefit amounts are additionally a function of the premium paid.

Figure 4:
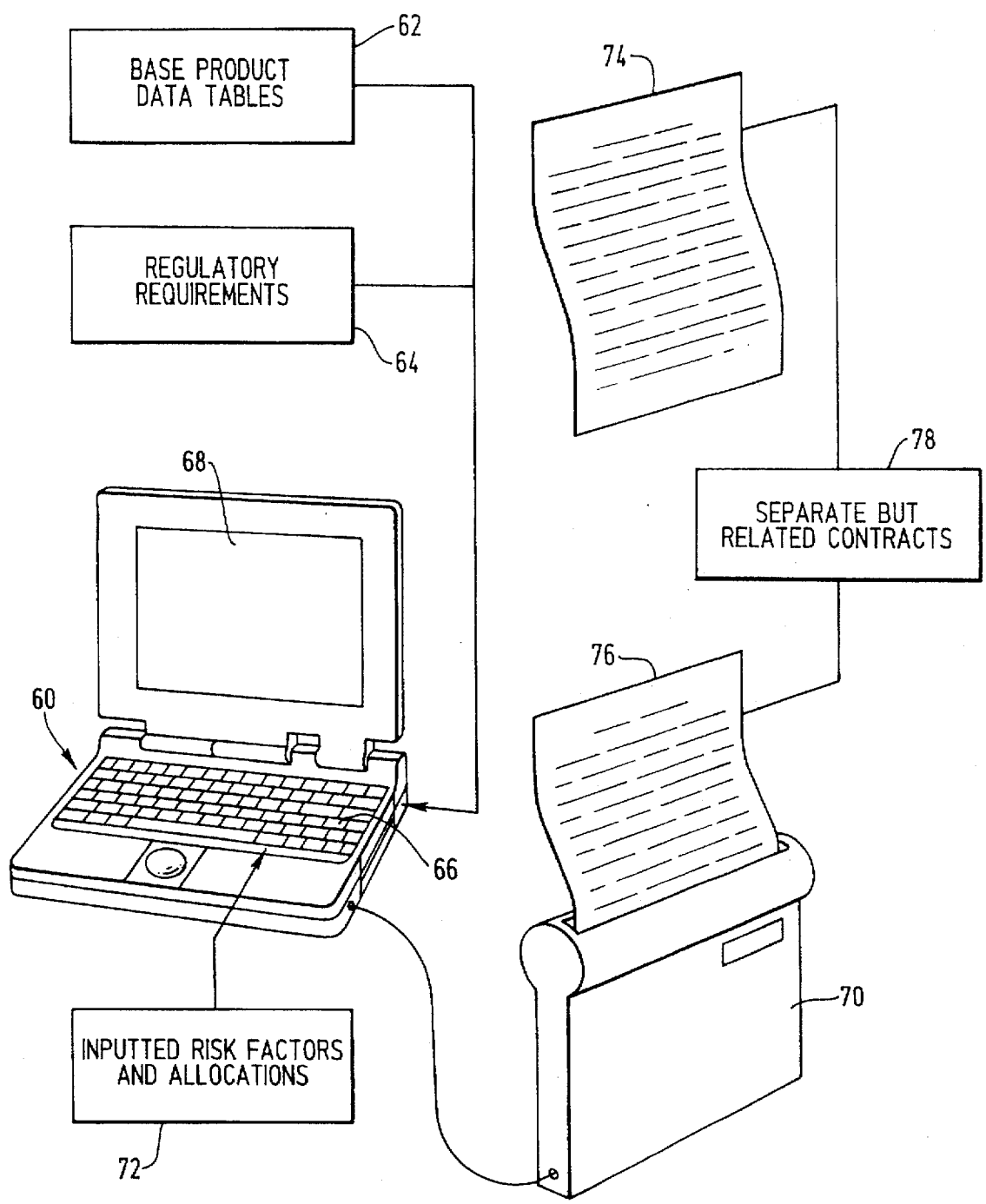
FIG. 4 is a perspective view partially in block diagram illustrating an insurance system.

Another variation of the invention is illustrated in FIG. 4 which shows a life insurance system based upon a portable computer 60 into which has been stored selective Base Product Data tables, represented by block 62, and regulatory requirements, represented by block 64. The computer contains a keyboard 66, a screen 68 and is connected to a portable printer 70. Such an arrangement may be used by an insurance agent when proposing the new multi-policy plan to prospective buyers. Once risk factors, such as gender, age, etc. are determined they may be inputted by way of the keyboard into the computer memory to be followed by information relating to the prospective allocations of benefits, obligations and values between the policies. This procedure is shown diagrammatically in FIG. 4 by the block 72. The agent may then use the information in the computer to compare the allocations against regulatory requirements as well as to vary the allocations, the values, the obligations and the benefits as desired by the prospective buyer or buyers. Thereafter, ledgers, contracts or contract outlines, represented by the two pieces of paper 74 and 76 and the block 78, may be prepared and handed to the prospective buyer or buyers while leaving a digitized version of the multi-contract plan in the memory of the computer.

It is to be understood that variations of the computer may be used such as one that transmits selected information directly to a home office for approval and/or record keeping. Also, the method of electronic presentation may vary. For example, a data processing apparatus may be used to control a point of sale display mechanism. It is the intent of the inventors to include existing hardware and well as hardware which will be developed in the future, and it is the intent of the inventors to present insurance information in electronic formats, paper formats or any new formats that are developed in the future. It is also to be understood that the sequence disclosed here may not be critical and thus may vary depending upon the selling company and/or its objectives.

Figure 5:
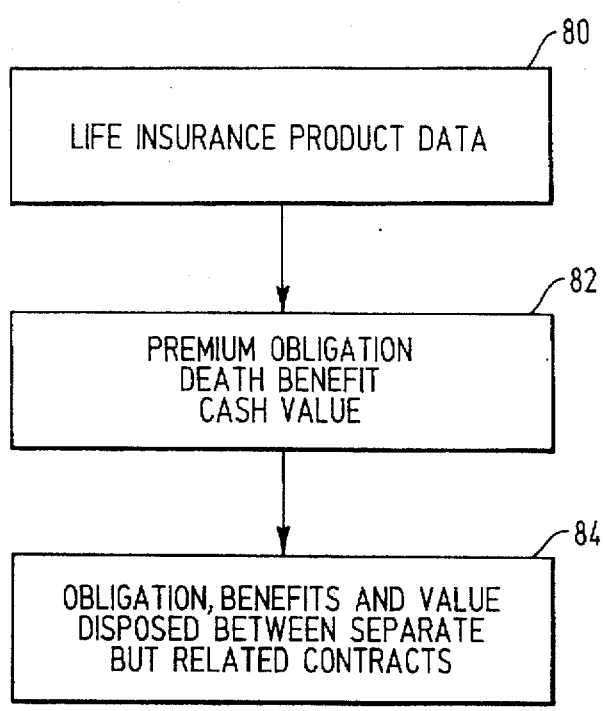
FIG. 5 is a block diagram illustrating a portion of an insurance system.

Also included in the invention is a simplified system illustrated in FIG. 5. There, the system includes life insurance Base Product Data, block 80, the premium obligation, death benefit and cash value amounts derived from the data, block 82, and the disposition of portions of the premium obligation, death benefit and cash value amounts between two or more marketable insurance contracts, block 84. As before, the premium obligation amount is more heavily loaded to one or more of the contracts while the cash value and benefit amounts are heavily allocated to one or more of the remaining contracts.

Figure 6:
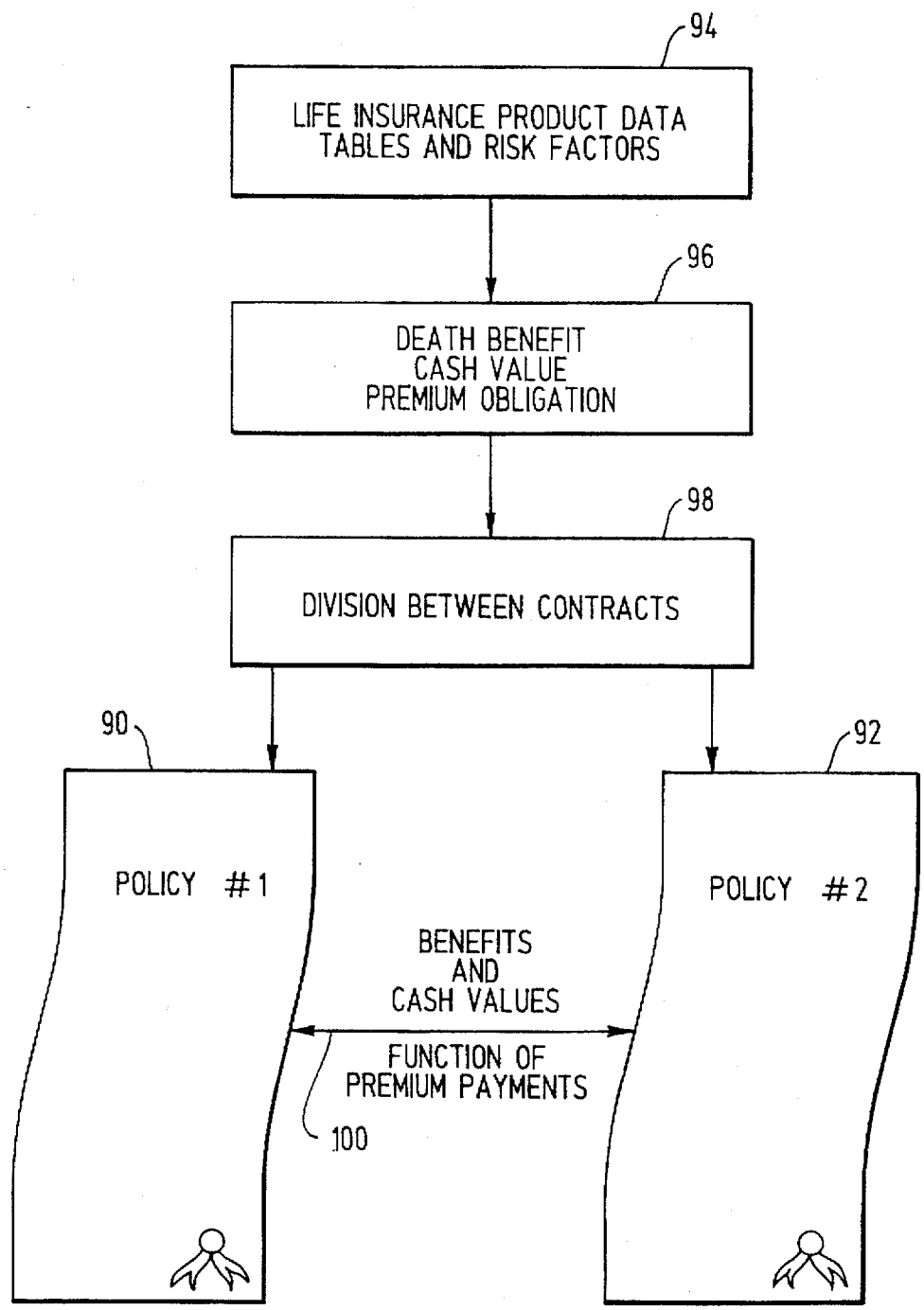
FIG. 6 is a top plan view, partially in block diagram, illustrating the inventive insurance product.

The present invention also includes a life insurance product as shown in FIG. 6 which comprises two separate but related insurance contracts 90, 92 which are formed by consideration of the life insurance Base Product Data tables and risk factors, represented by block 94, making a determination of the various values, obligations and benefits, represented by block 96 and then the allocation or division of those features between two policies as represented by block 98. The double-headed arrow 100 between the two policies represents the relationship between cash values and benefits of the two policies and the amount of premium payments. This relationship, stated in another way, is a mathematical correspondence between the premium obligations paid on both of the two contracts and the amount of cash values and benefits in both of the contracts (note, however, that if one of the policies is a term contract there is likely to be no cash value). Hence, cash values and benefits are a function of premiums paid.

Figure 7:
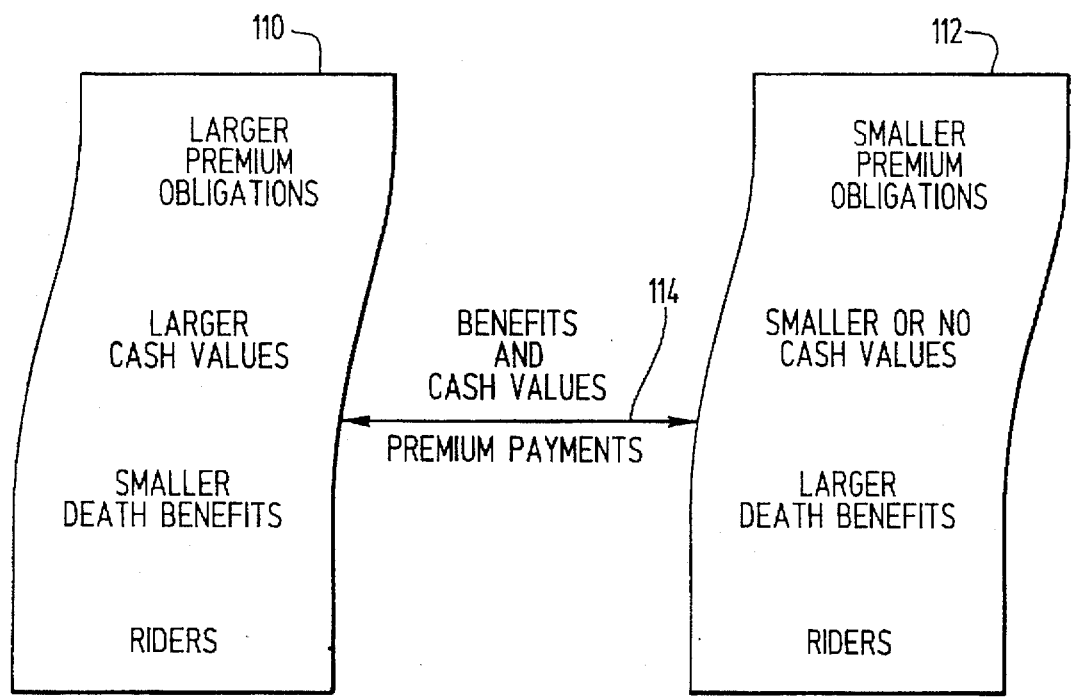
FIG. 7 is a top plan view of a variation of the product shown in FIG. 6.

Referring to FIG. 7, the advantages of a two policy concept over a split-dollar single policy plan may be appreciated and are achieved by the allocation of a larger premium obligation, a larger cash value and a smaller death benefit to contract 110 (along with riders and the like) while its related sibling contract 112 has allocated to it a smaller premium obligation, a smaller or no cash value and a larger death benefit. Riders and the like may also be present. Once again, a double-headed arrow 114 is used to show the connection between the two contracts in relation to the functional dependence of cash values, benefits and premium payments.

The plan illustrated by FIG. 7 can be used in a traditional split-dollar application, such as with a corporation and one of its executives. There the corporation will own the contract 110 and be its beneficiary. The insured is the executive. The executive will own the contract 112 and designate the beneficiary. The advantages are that the corporation pays the high premium but also controls the larger cash values. The executive benefits in having high death benefits at a low personal cost with a policy that is portable and independent should the corporation cease to pay premiums on contract 110.

Another split-dollar application will have a parent as the owner and beneficiary of the contract 110 while a child or trust will own and be the beneficiary of contract 112. The insured is the parent. The advantages are that the parent pays the larger premium and controls the larger cash values. This has the advantage that money from the parent's estate flows to the child outside the tax law gift limitation. Only the parent's payment of the low premiums under the contract 112 is considered a gift. Hence, this application leverages gifting for estate planning.

A third application has a corporation as owner and beneficiary of contract 110 and a shareholder as owner and beneficiary of contract 112. The advantages are that the corporation pays the high premium to allow the redemption of the shareholder's stock, while the shareholder has the additional benefit of low cost and high death benefit personal insurance.

A fourth application has a qualified retirement plan as the owner and beneficiary of the contract 110 while an employee is the owner and beneficiary of contract 112. The advantages are deductible premiums to the employer and high cash values in the retirement plan while the employee has large death benefits at minimal cost.

Figure 8:
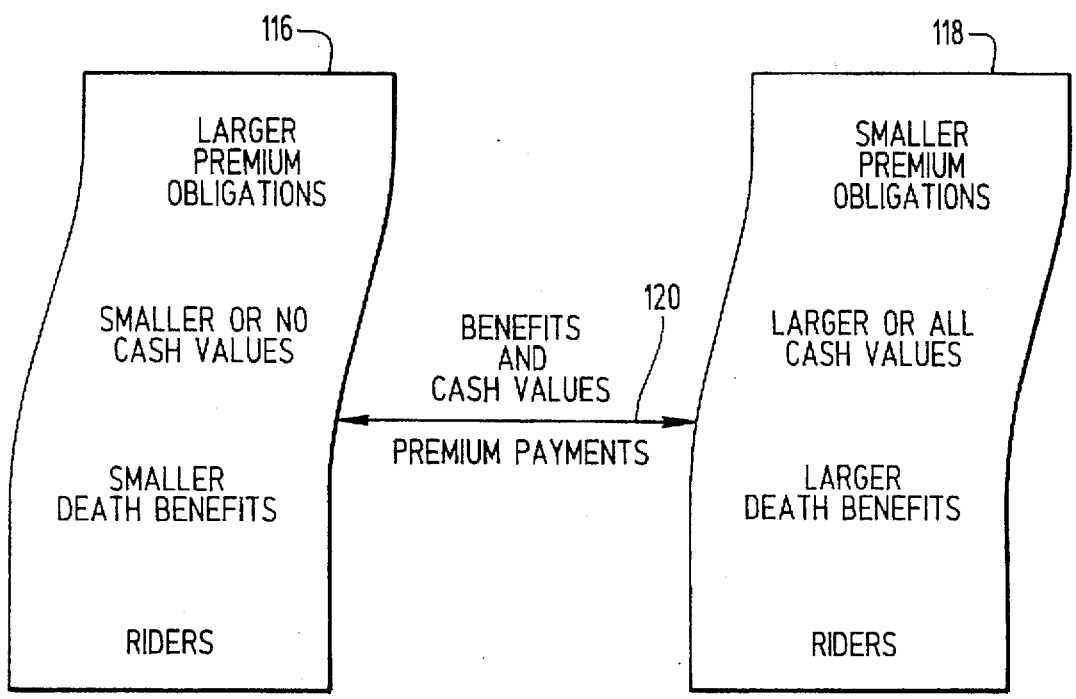
FIG. 8 is a top plan view of another variation of the product shown in FIG. 6.

By reference to FIG. 8, the two policy concept is applied to a reverse split-dollar arrangement. There the two separate but related insurance contracts 116 and 118 are connected by the double-headed arrow 120. The first of the two contracts has allocated to it a larger premium obligation, a smaller or no cash value amount and a smaller death benefit. The second of the two contracts 118 has allocated to it a smaller premium obligation, a larger or all of the cash values and a larger death benefit. Both contracts may contain riders and the like.

FIG. 8 illustrates a classic reverse split-dollar application. One example has a charity as owner and beneficiary of contract 116, and a child or trust as owner and beneficiary of contract 118. The insured is a parent. The premium for contract 116 is donated to the charity by the parent and is deductible. Hence, the parent has lower cost insurance. The death benefits are outside the parent's estate, and there is good leverage on the gift of the premium to the child to pay for the second policy, contract 118. There is also an elimination of the split-dollar agreement needed in the prior art between the owners of contracts 116 and 118. Finally, there is an elimination of split-dollar tax regulations and the need for accountants and lawyers.

Another FIG. 8 application has a charity as the owner and beneficiary of contract 116 and an individual as the owner and beneficiary of contract 118. The insured is the individual. The advantages are a charitable deduction for premium payments, ownership of large cash values by the individual and the elimination of the usual split-dollar agreement, tax regulations and expensive professional advisers.

A third FIG. 8 application has a corporation as the owner and beneficiary of contract 116, and an executive as the owner and beneficiary of contract 118. The advantages are that the corporation pays the high premium while cash accumulates outside the corporation for the benefit of the executive with little after tax cost. A fourth application has a parent as owner and beneficiary of contract 116 and a child as owner and beneficiary of contract 118. The advantages are that the high premiums remove money from the parent's estate, there is a high leverage gift of the premiums to the child for contract 118 and cash values and death benefits for the child accumulate outside the parent's estate.

A fifth application has a corporation as owner and beneficiary of contract 116 and a shareholder as owner and beneficiary of contract 118. The advantages are that the corporation funds a stock redemption, or the individual uses the application to fund a cross-purchase agreement at the lowest possible cost. A sixth application has a corporation as owner and beneficiary of contract 116 and a retirement plan as the owner of contract 118. The advantages are that the corporation pays the high premium and there is maximum leverage of the plan's investment, the second policy, contract 118.

Figure 9:
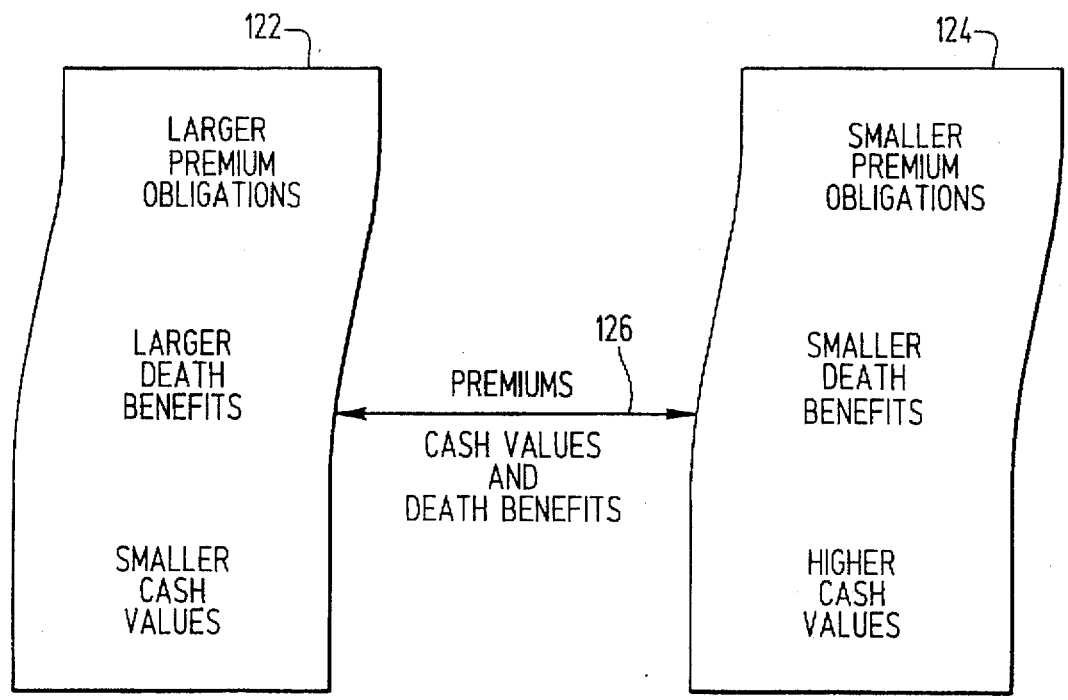
FIG. 9 is a top plan view of yet another variation of the product shown in FIG. 6.

Referring now to FIG. 9 there is shown another two policy plan variation where one contract 122 has a larger premium obligation, a larger death benefit and smaller cash values while its related sibling contract 124 has a smaller premium obligation, a smaller death benefit and larger cash values. The double arrow 126 symbolizes the relationship between premiums paid for both contracts and the amounts of benefits and values derived in both contracts.

An application of the plan illustrated by FIG. 9 has a corporation as the owner and beneficiary of contract 122 while a shareholder, or a retirement plan, or a shareholder's child owns contract 124. The advantages are that the corporation pays the larger premium and it funds a death buyout of the shareholder or a stock redemption. High cash values accumulate outside the corporation, there is a high return on the pension investment or there is a leveraged gift to the child. The FIG. 9 plan can also be used to equalize the payments by each shareholder funding a cross-purchase buy-sell agreement where the shareholders are of different ages, have different risk factors or have different percentages of ownership of the corporation.

Figure 10:
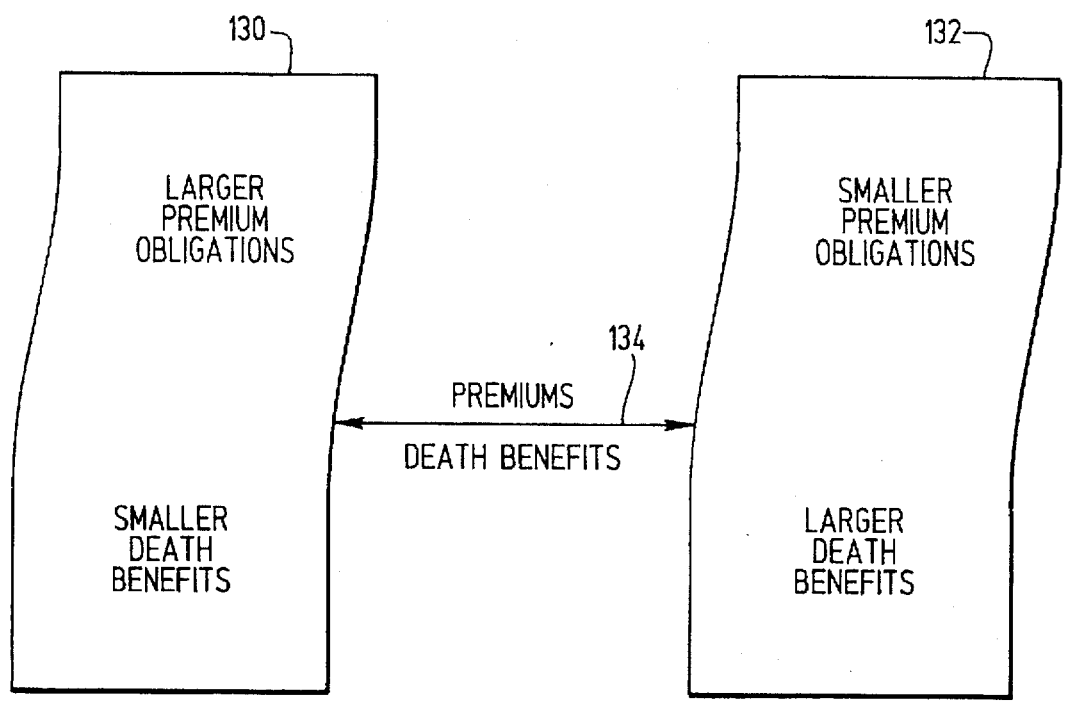
FIG. 10 is a top plan view of still another modification of the product shown in FIG. 6.

Yet another variation or modification of a multiple contract plan is shown in FIG. 10. It illustrates a term/term situation. The first term contract 130 has a larger premium obligation and a small death benefit while the related term contract 132 has a smaller premium obligation and a large death benefit. Since both policies are term contracts there are no cash values. The double-headed arrow 134 symbolizes the relationship between the two policies but since the plan uses only term policies the functional relationship exists between premiums and death benefits only.

An application of the plan illustrated by FIG. 10 has a corporation as the owner and beneficiary of contract 130 and a child or trust as owner and beneficiary of contract 132. The insured owns the corporation or is a key executive. The advantages include having the corporation pay the larger non-deductible premium with after tax dollars that have been taxed at the lower corporate rate, and the plan may be used to fund a stock redemption scheme. The benefit to the child or trust is that there is a leveraged gift to the child, a smaller non-deductible premium is paid by an entity using after tax dollars that have been taxed at a higher tax rate, and there is a savings of estate taxes.

A second application has a charity as the owner and beneficiary of contract 130 and a spouse, child, or trust is the owner and beneficiary of contract 132. The insured has a charitable deduction for his premium payment while the owner of contract 132 benefits by having low after tax premium obligations. There is also a leveraged gift advantage when the insured pays the premium on contract 132.

A third application for the FIG. 10 plan has shareholder A as the owner and beneficiary of the contract 130 and shareholder B as the owner and beneficiary of the contract 132. The advantage is that the cost to fund a cross purchase, buy-sell agreement between A and B may be equalized in a situation where the shareholders have different ages, risk classifications or percentage ownership.

In determining the type or types of policies to use for the two or more contracts and to determine the optimal allocation of premium obligation, death benefit and cash value, if any, amounts between the policies certain information will be needed, preferably to be inputted by the insurance agent, from the prospective buyers involved in the insurance transaction. For example, the insurance company will be required to know who the insured person or persons will be for the contracts. The company will also need to know the owner of each policy, the beneficiaries and the premium obligors.

In addition, the insurance agent will want a questionnaire form to be filled out by the prospective buyers or have responses inputted directly into the computer. This questionnaire will focus on financial objectives such as the purpose of the life insurance to be purchased. For example, a questionnaire might be used with the following nine choices to be checked off or chosen by a prospective buyer: 1.) fund income replacement; 2.) cash value accumulation for: A) college, B) retirement, C) other; 3.) liquidity for estate taxes; 4.) gifts to family members or a trust; 5.) gifts to charity; 6.) fund business buy-sell agreement; 7.) provide key man insurance; 8.) operate as an executive compensation plan; and 9.) other. A separate analysis by the agent or his company must be conducted for each of the above needs.

Next, the primary benefits are listed and may be checked by a prospective buyer or inputted directly into the computer. These include death benefits to beneficiaries, cash value accumulation to policy owners, tax savings to premium obligors or owners and tax savings to insured or insured's estates.

The premium obligor will also be quizzed. Questions will include whether the premium is to be paid by the insured, by another individual, by a business, by a trustee, by a charity or from a gift. The next series of questions concerns the source of funds for paying the premiums for each contract. These include a business, personal income, personal net worth and a gift.

The questionnaire will also include a series of statements to gauge the type of insurance policies to be used. For example, one policy might come from the group including: term, whole life, interest-sensitive whole life, universal life, variable life, variable universal life or others while the second policy may be the same type or a different type from the same group. As mentioned earlier any life contracts may be used from any of the three classes, term life, endowment or whole life or variations or combinations of these. Also the policies may have a single life insured, a joint first to die arrangement or a joint second to die structure.

The questionnaire will also include information about the insured party or parties. Information needed will include the name or names, gender, date or dates of birth, risk (from the group of preferred, non-smoker and smoker), state of residence, annual income, income tax bracket, net worth and estate tax bracket.

Next will be questions concerning the policy owners. Here, the questions are the policy owner's name, type of entity (individual, business, trust, charity or other), relationship to insured, annual income, income tax bracket, net worth, estate tax bracket and financial objectives. The same questions will be asked of the policy owner of the other policy or policies.

Finally, information concerning the policy beneficiaries will be solicited. These include the primary beneficiary or beneficiaries (and if more than one, the percentage split) and the contingent beneficiary or beneficiaries (and, if more than one, the percentage split). Once again, the exact same questions will be asked with regard to the second policy.

Policy riders which may be considered to be added to one or more of the separate but related contracts include: 1.) disability waiver of premium, 2.) additional term insurance riders, 3.) spouse and children rider, 4.) accidental death and dismemberment rider, 5.) guaranteed insurability option; 6.) change of insured rider; 7.) single premium adds rider; and 8.) annual adds rider. It is to be understood that this list is not all encompassing. Other riders may be added including those which may not yet be in existence.

It can clearly be seen that the separate but related policy plan is a distinct and unique improvement for applications which now use a single life insurance contract. The improvement under the present plan is derived from the flexibility of policy ownerships and choice of policy beneficiaries and the advantages of having the policy premiums and expenses concentrated in one or more of the contracts while having the benefits, cash values and dividends concentrated in one or more of the remaining contracts. Once again, however, it is to be noted that the total benefits and cash values in all of the policies are a function of the total premiums paid for all of the policies.

The types of applications suited for the separate-but-related policy product include the following when the goal is traditional split-dollar objectives: A) employer-employee; B) employer-spouse or trust of employee; C) family member-family member); D) charity-individual; E) trust-individual; F) charity-trust. The same entities are also suited for reverse split-dollar arrangements with the additional inclusion of employer-pension plan.

Other applications for the separate-but-related-policy product, besides split-dollar and reverse split-dollar, are, for example, key man insurance, estate preservation, buy-sell applications, charitable giving applications, income replacement, qualified retirement plan applications and estate liquidity applications. Other existing or future applications are also contemplated.

The inventors have calculated that there is a possible 124,416 combinations of insureds and owners for a two policy plan. For example, the insureds of the policies could be an individual, his or her spouse, or child, an employee, an employee's spouse and an employee's child. The owners of either or both policies could include the individual insured, the spouse of the insured, the child of the insured, a parent of the insured, a trust, a charity, an employer, an employer's trust, an employee, a spouse of an employee, a child of an employee, and a parent of an employee. Once again, the flexibility and wide scope of application are tremendous assets for the two separate-but-related policy arrangement.

In general operation, an insurance company will already have life insurance base product data which is available to its agents either in chart or electronic formats. To this would be added information from prospective customers relating to the insureds' gender, age, risk and the like, and the desired allocations of at least premium obligations, cash values, if present, and death benefits between two or more policy contracts. Ideally, this information is inputted into a portable computer. Other information such as potential riders, legal requirements and tax information are also available in the computer so that the prospective customer can be shown which multi-contract arrangement will best optimize the customer's financial planning objectives.

We claim:

1. A method for forming a life insurance plan comprising the steps of:

procuring life insurance product data;

selecting death benefit, cash value and premium obligation amounts based upon gender, age and other risk factors from said data;

storing factors representing regulatory requirements in a data processing apparatus;

forming in said apparatus at least two separate but related insurance contracts, said contracts being related by tying the total death benefit and cash value amounts for all of said contracts to the total premium obligation amount for all of said contracts;

dividing said death benefit, cash value and premium obligation amounts between said contracts;

comparing each of said contracts with the regulatory requirements; and displaying the resulting contracts.

2. A method of forming a life insurance plan for an insurable life or lives comprising the steps of:

providing life insurance product information;

determining a death benefit amount, a premium obligation amount and a cash value amount, if any, based upon gender, age and other risk factors from said information;

entering data relating to life insurance regulatory requirements into a data processing apparatus;

entering data relating to said life insurance product information into said data processing apparatus;

forming in said apparatus at least two separate but related insurance contracts covering said same insurable life or lives;

dividing in said apparatus said death benefit amount, said premium obligation amount and said cash value amount, if any, between said related contracts in a disproportional manner, said related contracts having different owners, wherein said related contracts create an obligation on the part of an insurer to pay said death benefit amount or said cash value amount according to all of said related contracts upon the happening of a preselected event or events relating to said insurable life or lives, and wherein the obligation on the part of said insurer to pay said death benefit amount or said cash value amount, if any, is legally subject to the payment of said premium obligation amount according to all of said related contracts;

comparing in said apparatus each of said related contracts with said life insurance regulatory requirements;

reallocating said premium obligation amount, said death benefit amount and/or said cash value amount, if necessary; and displaying the resulting contracts.

3. A method as claimed in claim 2 including the step of: establishing an owner for each of said contracts.

4. A method as claimed in claim 2 including the step of: establishing a beneficiary for each of said contracts.

5. A method as claimed in claim 2 including the step of: establishing a premium obligor for each of said contracts.

6. A method as claimed in claim 2 including the steps of:

placing more of said cash value amount in one or more of said contracts;

placing more of said premium obligation amount in one or more of the contracts; and wherein:

said cash value amount is a function of the premium obligation amount paid for all of said contracts.

7. A method as claimed in claim 6 including the step of: placing more of said death benefit amount in one of said contracts.

8. A method as claimed in claim 2 wherein:

each of said contracts may be chosen from among any of the classes of insurance policies including term life, endowment, universal life, variable life and whole life and all variations and combinations thereof.

9. A method as claimed in claim 2 including the step of: establishing non-forfeiture and surrender provisions for each of said contracts.

10. A method as claimed in claim 2 including the steps of:

establishing an owner for each of said contracts;

establishing a beneficiary for each of said contracts; and establishing a premium obligor for each of said contracts.

11. A method as claimed in claim 10 wherein:

the dividing step comprises allocating a larger portion of said cash value amount, if any, to one or more of said contracts, allocating a larger portion of said death benefit amount to one or more of said contracts and allocating a larger portion of said premium obligation to one or more of the contracts;

each of said contracts may be chosen from among any of the classes of insurance policies including term life, endowment, universal life, variable life and whole life and all variations and combinations thereof; and including the step of:

tying the death benefit and cash value amounts of said contracts to the total premium obligation amount paid for all of said contracts.

12. A computer implemented method for forming a life insurance plan comprising the steps of:

procuring life insurance product data;

selecting death benefit, cash value and premium obligation amounts based upon gender, age and other risk factors from said data;

forming at least two separate but related insurance contracts;

dividing said death benefit, cash value and premium obligation amounts between said contracts;

comparing in said computer each of said contracts with regulatory requirements; and publishing the resulting contracts.

13. A method as claimed in claim 12 including the step of:

creating a function between said death benefit and cash value amounts, and the premium obligation amount paid for all of said contracts.

14. A method as claimed in claim 13 including the steps of:

placing more of said death benefit amount in one of said contracts; and placing more of said cash value amount in one of said contracts.

15. A method as claimed in claim 14 including the steps of:
   establishing an owner for each of said contracts;
   establishing a beneficiary for each of said contracts; and
   establishing a premium obligor for each of said contracts.

16. A computer implemented method for providing a life insurance plan comprising the following steps:
   developing pricing information;
   developing life insurance products;
   providing a data processing apparatus;
   inputting into said apparatus risk factors relating to a prospective insured;
   deriving from said apparatus premium obligation, death benefit and cash value amounts;
   instructing said apparatus to disproportionately allocate said premium obligation, said death benefit and said cash value amounts between at least two related insurance contracts;
   inputting into said apparatus regulatory requirements to be met by a life insurance contract;
   comparing in said apparatus each of said contracts against said regulatory requirements;
   displaying said contracts, and the resulting premium obligation, death benefit and cash value amounts allocated to each of said contracts.

17. A method as claimed in claim 16 including the step of:
   making the death benefit and cash value amounts of said contracts legally subject to the total premium obligation paid for all of said contracts.

18. A life insurance system comprising:
   a data processing apparatus;
   means connected to said apparatus for inputting instructions;
   said apparatus having life insurance base product tables and regulatory requirements stored therein;
   inputted instruction in said apparatus to divide death benefits, cash values, if any, and premium obligations in a disproportional manner between at least two separate but related life insurance contracts;
   inputted instructions in said apparatus to compare said contracts against said regulatory requirements; and
   means connected to said apparatus for displaying the resulting contracts.

19. A system as claimed in claim 18 including:
   insurance rider data stored in said apparatus.

20. A system as claimed in claim 18 wherein:
   inputted instructions in said apparatus placing a large portion of said premium obligation amount against one or more of said contracts, a large portion of the cash value amount, if any, against one or more of the contracts and a large portion of the death benefit amount against one or more of the contracts.

21. A system as claimed in claim 18 wherein:
   said apparatus has instructions for making the death benefit and cash value, if any, amounts of said contracts a function of the total premium obligation amounts paid for all of said contracts.

22. A system as claimed in claim 18 wherein:
   said apparatus has instructions to allocate a large portion of said premium obligation amount to one or more of said contracts, a large portion of the cash value amount, if any, to one or more of the contracts and a large portion of the death benefits to one or more of the contracts;
   said apparatus has instructions designating an owner for each of said contracts;
   said apparatus has instructions designating a beneficiary for each of said contracts;
   said apparatus has non-forfeiture and surrender provisions for each of said contracts;
   said apparatus has insurance rider data stored therein; and
   said apparatus has instructions for making the death benefit and cash value, if any, amounts of said contracts, a function of the total premium obligation amounts paid for all of said contracts.

23. A life insurance system comprising:
   a data processing apparatus;
   life insurance base product data inputted in said apparatus;
   premium obligation, death benefit and cash value amounts derived from said base product data; and
   portions of said premium obligation, death benefit and cash value amounts are disposed in at leg two separate but related insurance contracts wherein the premium obligation, the death benefit and the cash value amounts are disproportionately allocated among said insurance contracts, said apparatus including means for displaying said contracts.

24. A system as claimed in claim 23 wherein:
   said base product data is an existing life insurance contract.

25. A system as claimed in claim 23 wherein:
   base product data is a new life insurance contract.

26. A system as claimed in claim 23 wherein:
   said premium obligation has portion X percent in one or more contracts and has portion (100 - X) percent in the remaining contracts;
   said death benefit has portion Y percent in one or more contracts and portion (100 - Y) percent in the remaining contracts; and
   said cash value has portion Z percent in one or more contracts and portion (100 - Z) percent in the remaining contracts, wherein Y and Z each represent a numerical value.

27. A computer implemented method for forming a life insurance plan comprising the steps of:
   inputting life insurance information including death benefits, cash values and premium obligations in said computer;
   dividing in a disproportional manner said death benefits, cash values and premium obligations between at least two separate but related contracts on the same insured or insureds to optimize financial objectives of owners of the contracts;
   comparing at least one of said contracts with preselected requirements to ensure conformance therewith;
   displaying said related contracts;
   providing for premium obligations payments by the owners; and
   providing cash values to the owners and death benefit payments to beneficiaries.

28. A method as claimed in claim 27 including:
   establishing an owner for each of said contracts;
   establishing a beneficiary for each of said contracts; and
   establishing a premium obligor for each of said contracts.

29. A method as claimed in claim 27 including:
   placing more of said cash values in one or more of said contracts, more of said death benefits in one or more of said contracts and more of said premium obligations in one or more of the contracts; and tying said death benefits and cash values by a function to the premium obligations paid for all of said contracts.

30. A method for providing a life insurance plan comprising the following steps:

developing pricing information;

developing life insurance products;

providing a data processing apparatus, inputting into said apparatus risk factors relating to a prospective insured;

deriving from said apparatus at least premium obligation and death benefit amounts;

instructing said apparatus to disproportionately allocate said premium obligation and said death benefit amounts between at least two separate but related insurance contracts in a disproportional manner;

inputting into said apparatus regulatory requirements to be met by a life insurance contract;

comparing in said apparatus each of said contracts against said regulatory requirements; and displaying said contracts, and the resulting premium obligation and death benefit amounts allocated to each of said contracts.

31. A method as claimed in claim 30 including;

tying said death benefit amount of said contracts to the total premium obligation amount paid for said contracts.

* * * * *